United States Patent [19]

Sellers

[11] Patent Number: 5,590,020
[45] Date of Patent: Dec. 31, 1996

[54] COLLAPSIBLE NOTEBOOK COMPUTER KEYBOARD STRUCTURE WITH RESILIENTLY DEFLECTABLE KEY CAP SKIRTS

[75] Inventor: Charles A. Sellers, Houston, Tex.

[73] Assignee: Compaq Computer Corporation, Houston, Tex.

[21] Appl. No.: 503,869

[22] Filed: Jul. 18, 1995

Related U.S. Application Data

[63] Continuation-in-part of Ser. No. 268,818, Jun. 30, 1994, Pat. No. 5,532,904.

[51] Int. Cl.$^6$ .............................. G06F 1/16; H01H 3/12; B41J 11/56; H05K 7/04
[52] U.S. Cl. .......................... 361/680; 200/341; 200/344; 400/490; 400/682
[58] Field of Search ...................... 200/5 A, 344, 200/345, 341; 400/490–492, 682, 479, 488; 364/708.1; 341/22; 235/1 D, 145 R, 146; 361/680

[56] References Cited

U.S. PATENT DOCUMENTS 5,268,545  12/1993  Bruner .................................... 200/345
5,463,195  7/1994  Watanabe et al. ...................... 200/344
5,466,901  11/1995  Mochizuki ............................. 200/5 A Primary Examiner—Michael W. Phillips
Attorney, Agent, or Firm—Konneker & Smith

[57] ABSTRACT

A notebook computer is provided with a collapsible keyboard structure in which, in response to closing of the computer housing lid, the key return spring portions of the keyboard are shifted horizontally away from their normal underlying relationships with the keys and the keys are forcibly retracted downwardly to a storage/transport orientation in which the overall vertical thickness of the keyboard structure is reduced by an amount somewhat greater than the stroke distance of the keys. Each key has a relatively rigid top side portion with a periphery around which is secured a downwardly and horizontally outwardly sloped resilient skirt structure. In response to the forcible downward movement of the keys to their retracted positions the skirt structures are pressed and vertically compressed against a bottom side portion of the monoblock member that operatively carries the keys, thereby reducing the vertical height of the keyboard by more than the normal stroke distance of the keys when the computer is in its closed storage and transport orientation. When the lid is subsequently opened, the key return spring portions are upwardly shifted back to their normal underlying relationships with the keys, and the keys are forced upwardly by the return spring portions to their extended, operative orientations above the return spring portions.

23 Claims, 4 Drawing Sheets

COLLAPSIBLE NOTEBOOK COMPUTER KEYBOARD STRUCTURE WITH RESILIENTLY DEFLECTABLE KEY CAP SKIRTS

CROSS REFERENCE TO RELATED APPLICATION

This application is a continuation-in-part of U.S. application Ser. No. 08/268,818, now U.S. Pat. No. 5,532,904 filed on Jun. 30, 1994 and entitled "COLLAPSIBLE KEYBOARD STRUCTURE FOR A NOTEBOOK COMPUTER".

BACKGROUND OF THE INVENTION

1. Field of the Invention

The present invention relates generally to computer apparatus, and more particularly relates to keyboard structures for portable computers such as notebook computers.

2. Description of Related Art

In recent years the notebook computer has made considerable gains in both popularity and technical sophistication. One factor contributing to the increasing popularity of the notebook computer is its ever decreasing size and weight, a factor arising from the ability to fabricate various components of the computer in smaller and smaller sizes while, in many cases, increasing the power and/or operating speed of such components.

One continuing challenge in the design of notebook computers, however, is the keyboard structure. This design challenge arises from two conflicting design goals—the desire to even further reduce the size of the keyboard structure, and the desirability of having the notebook computer emulate as closely as possible the size and typing "feel" of a desktop computer keyboard.

There are, of course, two dimensional factors which may be varied to reduce the size of a notebook computer keyboard structure—its horizontal dimensions (i.e., its length and width), and its vertical or thickness dimension. The horizontal dimensions of the keyboard are governed by the number, size, and relative spacing of the manually depressible key cap portions of the keyboard, and various reductions in these three dimensional factors may be utilized to reduce the overall length and/or width of the keyboard. However, as will be readily appreciated, a reduction in these three configurational aspects to gain a keyboard size reduction correspondingly lessens the similarity of the notebook computer keyboard in appearance, key arrangement and typing feel to its desktop counterpart.

Similar restraints are also presented when attempts are made to reduce the overall thickness of a notebook computer keyboard. One possibility which has been investigated and attempted is to simply reduce the keystroke distance in the notebook computer keyboard compared to its desktop counterpart. Using this design technique, the overall thickness of the notebook computer in its closed storage and transport orientation may be correspondingly reduced. However, this thickness reduction in the overall notebook computer, achieved by reducing the keyboard keystroke distance, creates what many users consider to be an undesirable typing "feel" difference compared to the longer keystroke distance typically found in a larger desktop computer keyboard.

Another possibility that has been considered and evaluated has been to simply reduce the vertical thicknesses of the individual key cap members so that they can be positioned closer to their underlying support structure without reducing their normal key stroke distance. While this approach reduces the overall vertical thickness of the keyboard assembly it is considered to be aesthetically unpleasing since a gap is created between the computer bezel and the bottom of each key cap member, thereby unattractively exposing the underlying key switch mechanisms to view.

As can be readily seen from the foregoing, it would be desirable to provide an improved notebook computer keyboard structure which permits a useful thickness reduction in the closed computer without a corresponding reduction in the operative keystroke distance of the keyboard structure or an aesthetically unattractive vertical shortening of the key cap members. It is accordingly an object of the present invention to provide such an improved notebook computer keyboard structure.

SUMMARY OF THE INVENTION

In carrying out principles of the present invention, in accordance with a preferred embodiment thereof, a portable computer, representatively a notebook computer, is provided with a specially designed collapsible keyboard structure. The computer includes a base housing portion having a top side, and a lid housing portion secured to the base housing portion for pivotal movement relative thereto between a closed position in which the lid housing portion extends across and covers the top side, and an open position in which the lid housing portion uncovers and exposes the top side of the base housing portion.

In a preferred embodiment thereof, the collapsible keyboard structure includes a first support structure, representatively a generally rectangular monoblock structure, extending across the top side of the base housing portion and itself having top and bottom side portions. A series of key cap members are carried on the top side portion of the first support structure for vertical movement relative thereto, through a vertical key stroke distance, between extended and retracted positions separated by a vertical distance greater than the key stroke vertical distance.

Each of the key cap members has a relatively rigid top side portion with a horizontal periphery, and a resiliently deflectable skirt portion anchored to and extending around the periphery and extending downwardly and horizontally outwardly therefrom. Preferably, the top side portions of the key cap members are formed from a plastic material, while the resilient peripheral skirt portions are formed from an elastomeric material, such as rubber, and are suitably anchored to the peripheries of the key cap member top side portions.

A second support structure, representatively a multilayered keypad structure, is carried beneath the first support structure and has a top side facing the bottom side portion of the first support structure. A spaced series of resilient key return members, preferably elastomeric key return domes, are anchored to the second support structure for horizontal movement therewith and have top end portions projecting upwardly beyond the top side of the second support structure.

The first and second support structures are horizontally shiftable relative to one another between a first position in which the key return members underlie and resiliently hold the key cap members in their extended positions and permit the key cap members to be resiliently moved downwardly therefrom through their key stroke distances by a user of the computer, and a second position in which the key return members are horizontally shifted in a manner permitting the key cap members to be forcibly moved downwardly from their extended positions to their retracted positions without vertically compressing the resilient key return members.

When the key cap members are downwardly driven to their retracted positions their resilient skirt portions bear against and are deflected horizontally outwardly by the bottom side portion of the first support structure when the key cap members are in their retracted positions. This unique vertical resilient compression of the key cap structures in their retracted positions reduces the height of the key cap members, and thus the vertical thickness of the overall keyboard structure, by a distance greater than the operative stroke distances of the key cap members when the key cap members are in their fully retracted storage and transport orientations. Thus, the overall keyboard height with the computer in its closed storage and transport orientation is substantially reduced without (1) reducing the normal keystroke distance, or (2) reducing the vertical thicknesses of the key cap members in their upwardly extended operating positions.

In the preferred embodiment of the collapsible keyboard of the present invention, first shifting means, responsive to opening the lid housing portion, are operative to relatively shift the first and second support structures to their first position, and second shifting means, responsive to closing the lid housing portion, are operative to relatively shift the first and second support structures from their first position to their second position. Additionally, means are provided for forcibly driving the key cap members from their extended positions to their retracted positions in response to the relative shifting of the first and second support structures from their first position to their second position, and for forcibly driving the key cap members from their retracted positions to their extended positions in response to the relative shifting of the first and second support structures from their second position to their first position.

DETAILED DESCRIPTION

Figure 1:
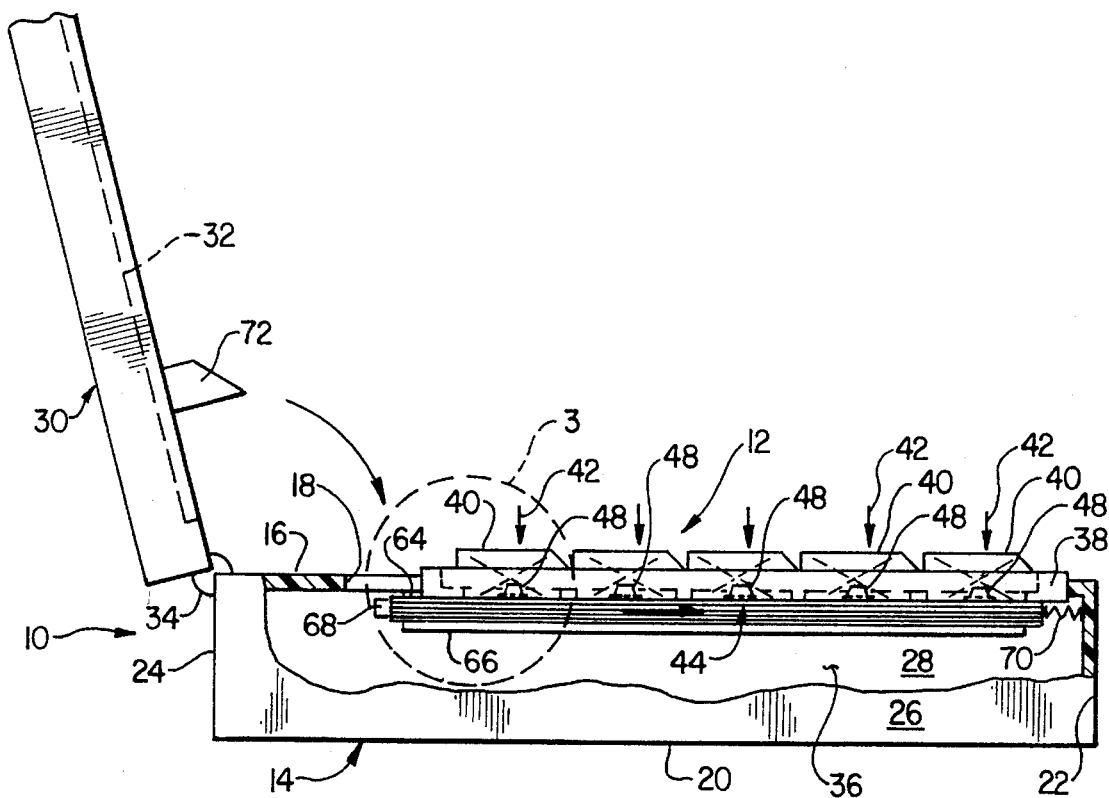
FIG. 1 is a partially sectioned, simplified side elevational view of a notebook computer having a collapsible keyboard structure embodying principles of the present invention, the computer being in an opened orientation and the keyboard structure being in its key-extended use configuration.
Figure 2:
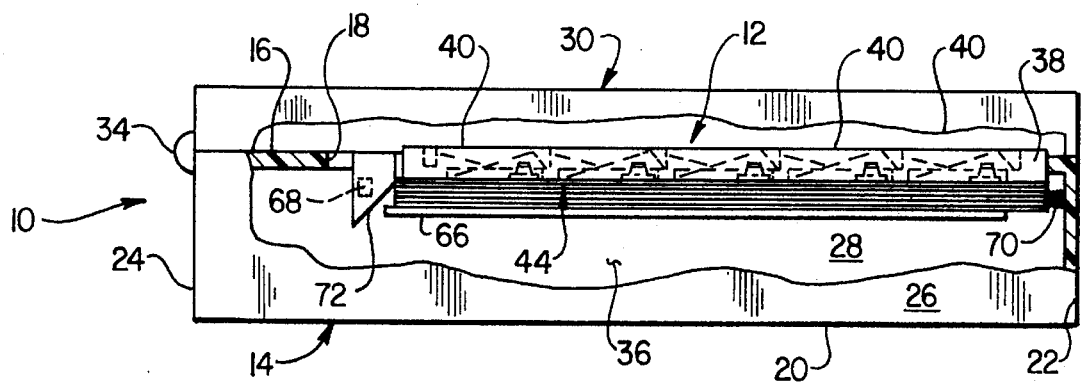
FIG. 2 is a view similar to that in FIG. 1, but with the computer in its closed orientation and the keyboard structure being in its key-retracted storage/transport orientation.

Referring initially to FIGS. 1 and 2, the present invention provides a portable computer, illustratively a notebook computer 10, having incorporated therein a specially designed collapsible keyboard structure 12 embodying principles of the present invention. Computer 10 includes a hollow rectangular base housing 14 having a top horizontal side wall 16 with an opening 18 therein; a bottom horizontal side wall 20; front and rear vertical end walls 22,24; and a pair of opposite vertical side walls 26,28.

A hollow rectangular lid housing 30, having a display screen 32 on its front or inner side, is pivotally secured along a hinge joint 34 to a top rear corner portion of the base housing 14. Lid housing 30 may upwardly pivoted to place the computer 10 in an open use orientation (FIG. 1) in which the top side 16 of the base housing 14 is exposed and the display screen 32 forwardly faces the user of the computer, or downward pivoted to place the computer 10 in a closed storage and transport orientation (FIG. 2) in which the lid housing extends across and covers the top side of the base housing 14. Suitable latch means (not shown) are provided to releasably retain the lid housing 30 in its FIG. 2 closed orientation.

The collapsible keyboard structure 12 extends across the opening 18 in the top side wall 16 of the base housing 14 and occupies only a relatively small upper portion of the interior 36 of the base housing. Referring now to FIGS. 1, 2 and 4, the keyboard structure basically comprises a relatively thin rectangular monoblock support structure 38 that horizontally extends across the base housing top side opening 18 and is suitably anchored to the base housing 14; a series of manually depressible key cap members 40 carried for vertical movement relative to the support structure 38 (as indicated by the arrows 42 in FIG. 1) through a keystroke distance D (see FIG. 3A); and a rectangularly configured, multilayer signal pad structure 44 that underlies the support structure 38 and is transverse to the keystroke directions 42.

The signal pad structure 44, which is of a generally conventional construction, is shown in simplified exploded form in FIG. 4 and includes, from top to bottom, (1) a plastic dome sheet 46 having a spaced series of rubber key return domes 48 projecting upwardly from its top side; (2) a plastic top circuit sheet 50 having a spaced series of circular, electrically conductive pads 52 disposed on its bottom side, aligned with the domes 48, and connected to surface trace circuitry (not shown) formed on the sheet 50; (3) a plastic spacer sheet 54 having a spaced series of circular openings 56 formed therein and underlying the pads 52; (4) a plastic bottom circuit sheet 58 having a spaced series of circular, electrically conductive pads 60 disposed on its top side, aligned with the sheet openings 56, and connected to surface trace circuitry (not shown) formed on the sheet 58; and (5) a metal backing sheet 62.

The five sheet members 46,50,54,58,62 are suitably held in their indicated stacked orientation to combinatively define the overall signal pad structure 44. As illustrated in FIGS. 1–3B, the signal pad structure 44 has opposite side edge portions that are slidably retained between two sets of horizontal rail member pairs 64,66 formed on the interior sides of the base housing side walls 26 and 28. For purposes later described, the rail member pairs 64,66 support the signal pad structure 44 for horizontal front-to-rear movement relative to the base housing 14, and thus relative to the keyboard support structure 38, between a first position (FIGS. 1 and 3A) in which the left or rear side edge of the signal pad structure 44 abuts a pair of stop projections 68 formed on the inner sides of the base housing side walls 26 and 28, and a second position (FIGS. 2 and 3B) in which the signal pad structure 44 is forwardly shifted away from the stop projections 68.

With the computer lid housing 30 in its FIG. 1 open position, a plurality of schematically depicted compression spring members 70, interposed between the right or front edge of the signal pad structure 44 and the front base housing end wall 22, resiliently hold the signal pad structure 44 in its first position. However, as the lid housing 30 is subsequently closed, a spaced pair of tapered cam projections 72 disposed on the front or inner side of the lid housing 30 engage the rear side edge of the signal pad structure 44 and drive it to its second position (FIG. 2) against the resilient resistance force of the spring members 70. When the lid housing 30 is opened again, the cam projections 72 are lifted out of engagement with the signal pad structure 44 to thereby permit the spring members 70 to drive the signal pad structure 44 back to its FIG. 1 first position.

According to an important aspect of the present invention, in a manner subsequently described herein this selective shifting of the signal pad structure 44 relative to the keyboard support structure 38 is operative to automatically shift the key cap members 40 between a FIG. 3A extended operating orientation (when the signal pad structure 44 is in its leftwardly shifted first position), and a FIG. 3B retracted position (when the signal pad structure 44 is in its rightwardly shifted second position).

Turning now to FIGS. 3A, 3B, 5A and 5B, each of the key cap members 40 has a hollow, rectangular molded plastic body with a top side wall 74 with a downwardly and forwardly sloping front edge portion 76, and an open bottom side 78. A scissored linkage assembly 80 is secured to the bottom of each of the key cap members 40 and includes a first pair of scissor arms 82 and a second pair of scissor arms 84, with longitudinally intermediate portions of the arms 82 being pivotally connected to longitudinally intermediate portions of the arms 84 as indicated.

First ends of the arms 82 are joined by a cylindrical rod 86 pivotally anchored in tabs 88 projecting downwardly from the top key member wall 74, while the opposite ends of the arms 82 have outwardly projecting cylindrical pins 90 formed thereon and slidingly received in a slot 92 formed in the bottom side of the support structure 38. First ends of the arms 84 are joined by a cylindrical rod 94 having its opposite ends pivotally anchored in tabs 96 on the bottom side of the support structure 38, while the opposite ends of the arms 84 have outwardly projecting cylindrical pins 98 slidingly received in slots 100 formed on the underside of the key cap member 40.

Longitudinally intermediate portions of the scissor arms 84 are interconnected by a joining plate structure 102 having, on its underside, a bottom bearing surface 104, and a forwardly facing cam surface 106 extending at an angle to the bearing surface 104. The scissored linkage assembly 80 is movable relative to its associated key cap member 40 between an extended position shown in FIGS. 3A and 5A, and a retracted position shown in FIGS. 3B and 5B.

Figure 3A:
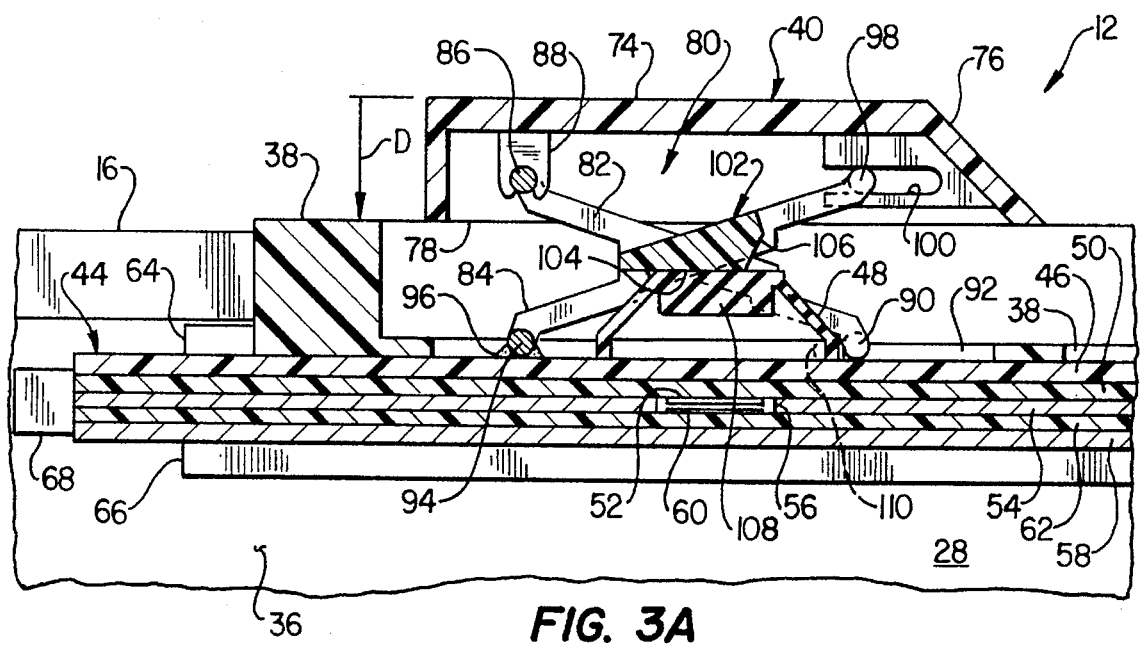
FIGS. 3A and 3B are enlarged scale cross-sectional detail views of the circled area "3" in FIG. 1 with the keyboard key cap members respectively in their extended use positions and their retracted storage/transport positions.
Figure 3B:
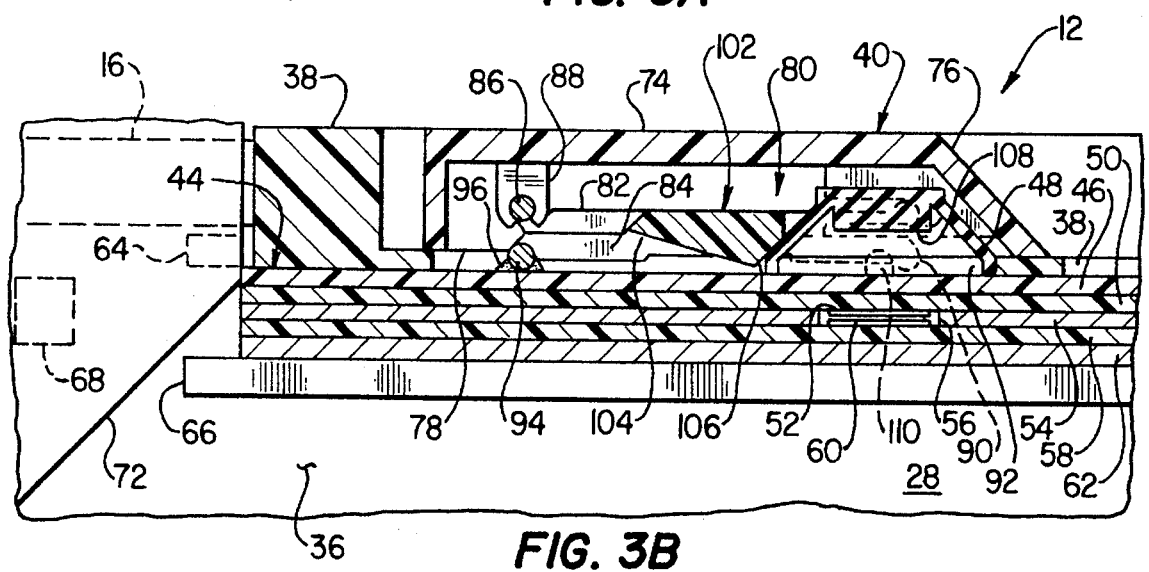
Figure 4:
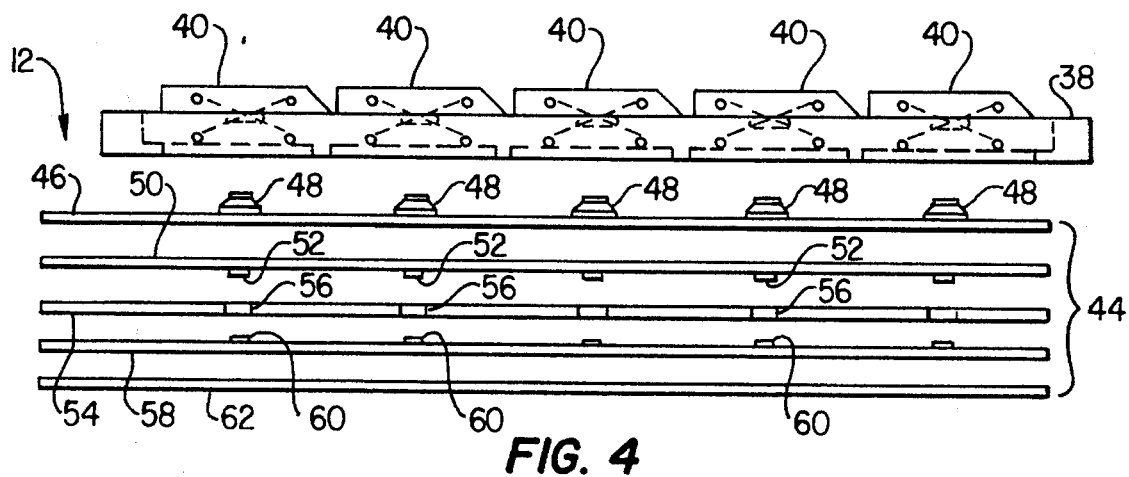
FIG. 4 is a highly schematic exploded side elevational view of the keyboard structure.
Figure 5A:
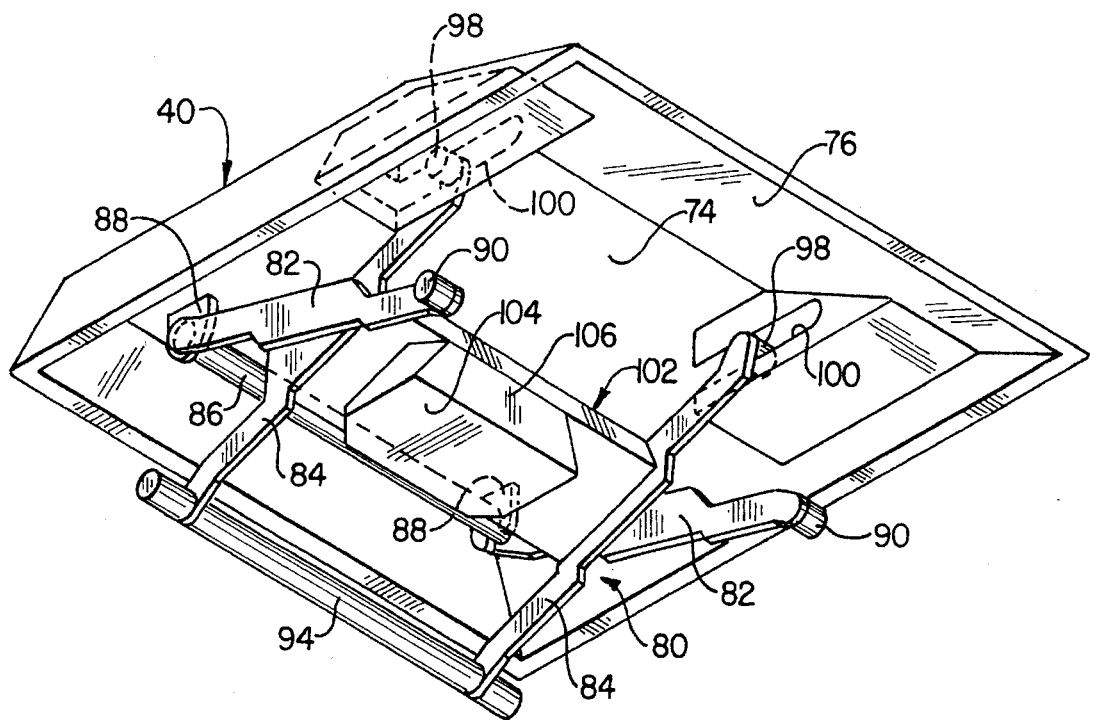
FIGS. 5A and 5B are enlarged scale bottom side perspective views of a key cap member respectively illustrating a scissored support portion thereof in its extended and retracted position.
Figure 5B:
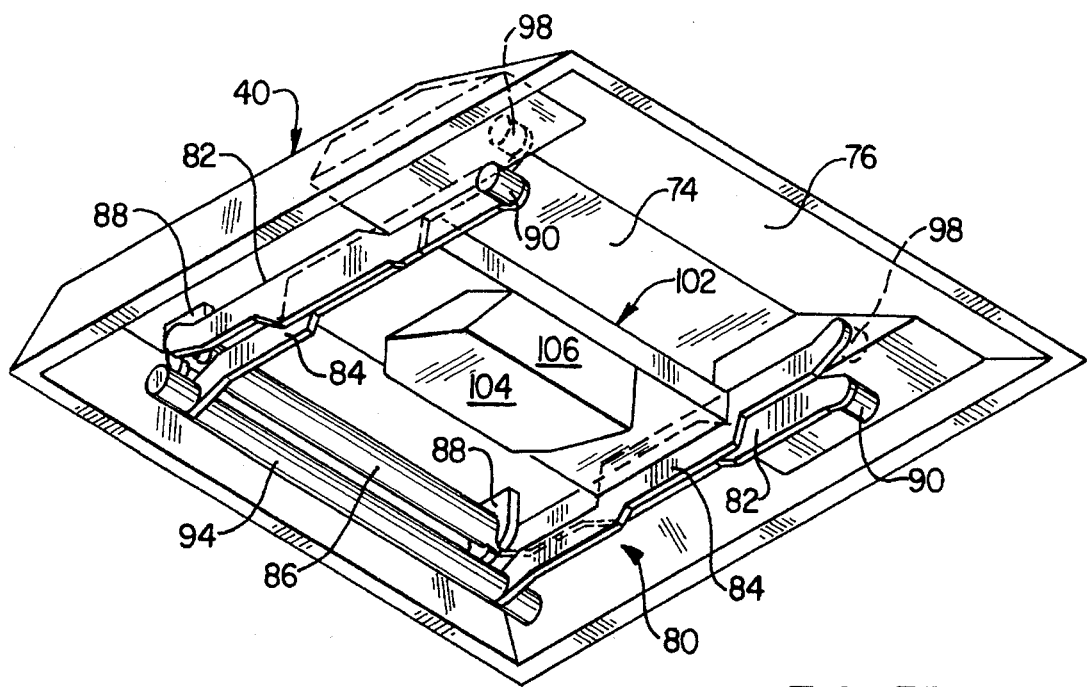

Referring now to FIGS. 3A and 3B, with the lid housing 30 opened, the signal pad structure 44 is driven to its FIG. 3A position (by the spring members 70 shown in FIG. 1), and the key cap members 40 are in their FIG. 3 operatively extended positions in which the scissored linkage assemblies 80 are in their extended positions, with the bearing surfaces 104 of the linkage assemblies 80 overlying and downwardly engaging the upper ends of the resilient key return domes 48.

When any of the key cap members 40 is manually depressed, against the resilient resistance of its associated return dome 48, the dome is downwardly deformed to cause an internal projection 108 therein to be downwardly pressed against a portion of the dome sheet 46 underlying the projection 108. This, in turn, causes the contact pad pair 52,60 underlying the projection 108 to be brought into engagement with one another and cause their associated circuitry to output an electrical signal indicative of the striking of their associated key cap member. When the key cap member is released from its manually depressed orientation, it is automatically returned upwardly to its FIG. 3A position by the resilient force of its underlying key return dome 48 which functions as a return spring means.

When the signal pad structure 44 is forwardly shifted from its FIG. 3A position to its FIG. 3B position, in response to closing the lid housing 30 as previously described, the key return domes 48 are forwardly moved out from under their associated scissor linkage bearing surfaces 104, and the scissored linkage assemblies 80 are forcibly driven to their retracted FIG. 3B positions. This, in turn, downwardly drives the key cap members 40 to their FIG. 3B retracted positions, thereby reducing the overall thickness of the collapsible keyboard structure 12 by the keystroke distance D.

The forcible retraction of the key cap members 40 is effected by a spaced series of upward projections 110 formed on the top side of the dome sheet 46. Pairs of the projections 110 are positioned on opposite sides of the domes 48 and located immediately behind the opposite ends of the scissor arm pins 90. When the signal pad structure 44 is rightwardly driven away from its FIG. 3A position the projections 110 rightwardly engage and drive the pins 90 to thereby forcibly move the scissored linkage assemblies 80 from their FIG. 3A extended positions to their retracted FIG. 3B positions. Alternatively, the projections 110 could be omitted and the key cap members 40 permitted to fall by gravity to their retracted FIG. 3B positions when the signal pad structure 44 is rightwardly driven from its FIG. 3A position to its FIG. 3B position.

When the lid housing 30 is opened again, the resulting leftward or rearward driven movement of the signal pad structure 44 causes the sloping rear side surfaces of the key return domes 48 to rearwardly engage the forwardly and upwardly sloped cam surfaces 106 of the linkage assemblies 80 in a manner forcing the linkage assemblies 80 back to their FIG. 3A extended positions in which the upper ends of the domes 48 underlie and engage the linkage assembly bearing surfaces 104 to thereby return the key cap members 40 to their upwardly extended operative positions.

From the foregoing it can be seen that the collapsible keyboard structure 12 of the present invention effectively reduces the thickness of the keyboard structure in its FIG. 3B storage/transport orientation by the key stroke distance D, and automatically brings the keyboard structure to this orientation in response to the closure of the lid housing 30. Accordingly, the key stroke distance D does not have to be undesirably reduced (compared to the corresponding key stroke distance of a desktop computer keyboard) to reduce the storage/transport thickness of the keyboard structure 12.

While the keyboard structure 12 has been representatively depicted as having the keyboard support structure 38 fixedly secured to the base housing 14, with the signal pad structure 44 being shiftable relative to the support structure 38, it will be appreciated that, alternatively, the keyboard support structure 38 could be shifted relative to the signal pad structure 44 if desired.

Additionally, while the key structures 40 have been representatively illustrated as being supported on the keyboard carrying structure 38 using scissored linkage assemblies, other means of supporting the key cap members 40 for vertical movement could be utilized if desired. Moreover, spring return means other than the rubber key return domes 48 could be provided for forward and rearward shifting relative to the key cap members if desired.

Figure 6A:
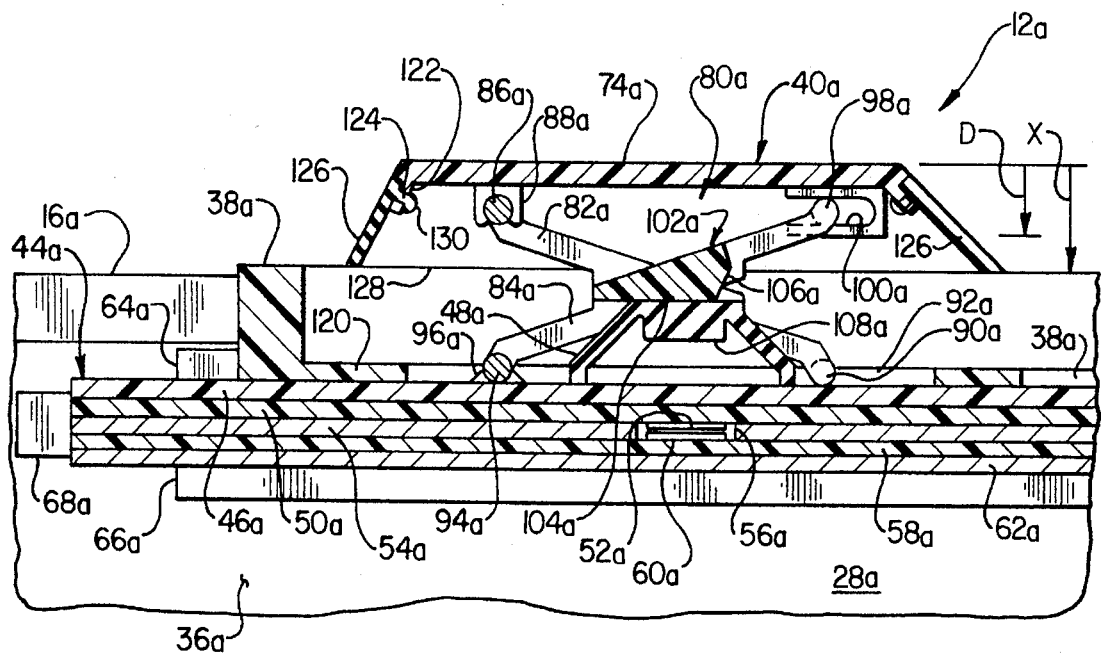
FIGS. 6A and 6B are cross-sectional detail views that are respectively similar to FIGS. 3A and 3B and illustrate portions of an alternate embodiment of the collapsible keyboard structure.
Figure 6B:
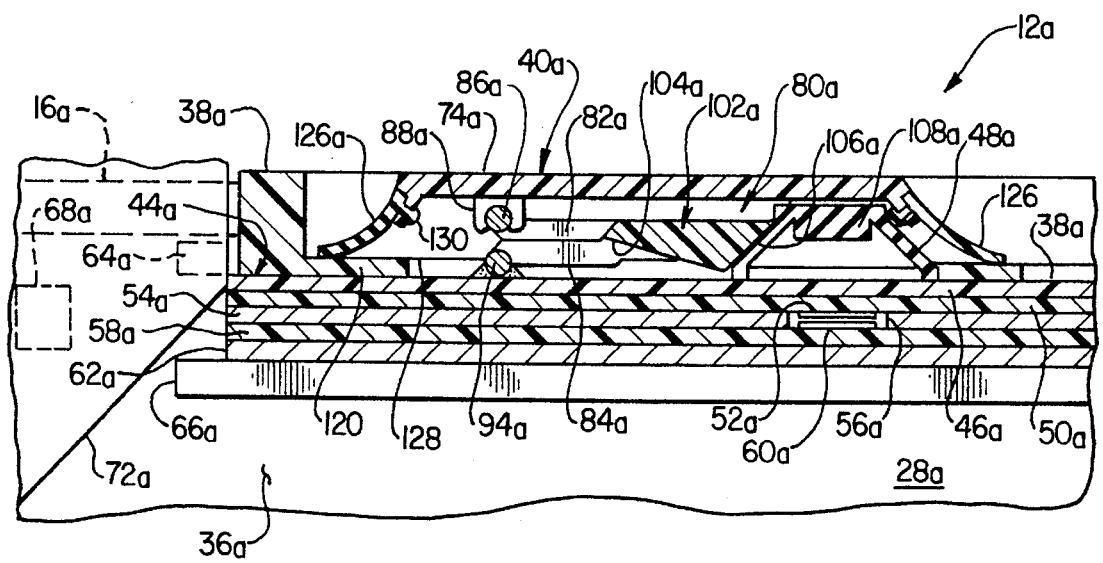

Illustrated in FIGS. 6A and 6B in somewhat simplified form is an alternate embodiment 12a of the previously described collapsible keyboard structure 12. To facilitate comparison of the two collapsible keyboard structures 12 and 12a, the components in the keyboard 12a similar to those in keyboard 12 have been given identical reference numerals with the subscripts "a". FIG. 6A illustrates the collapsible keyboard structure 12a with its key cap members 40a in their upwardly extended operating positions (with the lid housing 30 opened), while FIG. 6B illustrates the key cap members 40a in their downwardly retracted positions (with the lid housing 30 closed).

The scissored linkage assembly 80a is substantially identical in construction and operation to its counterpart linkage 80 shown in FIGS. 3A and 3B and operates in conjunction with the key return domes 48a to upwardly extend and downwardly retract the key cap members 40 in response to opening and closing the lid housing 30 which creates the previously described horizontal shifting of the signal pad structure 44a.

However, in this embodiment 12a of the collapsible keyboard the key cap members 40a, when forcibly driven downwardly from their FIG. 6A upwardly extended positions to their FIG. 6B retracted positions are downwardly moved through a distance X (see FIG. 6A) which is greater than the normal keystroke distance D, thereby reducing the vertical thickness of the keyboard structure in its retracted position by an amount greater than its keystroke distance. Importantly, this additional keyboard height reduction is achieved without (1) reducing the standard keystroke distance D, or (2) reducing the overall vertical thickness of the key cap members 40a in a manner undesirably exposing the underlying switching and linkage mechanisms to user view. As will now be described, these advantages are achieved by providing the key cap members with a special construction and configuring the scissored linkages 80a to drive the key cap members 40a downwardly from their FIG. 6A extended positions to their FIG. 6B retracted positions through a distance greater than the vertical distance between each key cap member and the bottom side portion 120 of the monoblock structure 38a.

Specifically, as illustrated in FIGS. 6A and 6B, each key cap member 40a has a relatively rigid plastic top side wall 74a having a rectangular configuration and a horizontally inset, relatively shallow depending peripheral portion 122 with a horizontally spaced series of holes 124 formed therein. A flexible skirt 126, preferably of an elastomeric material such as rubber, is anchored at a top side thereof to the peripheral portion 122, slopes downwardly and horizontally outwardly therefrom, and has an open bottom side 128. Skirt 126 may conveniently be molded onto the peripheral portion 122, and to this end has a horizontally spaced series of projections 130 that are received and anchored within the skirt holes 124.

When the key cap members 40a are forcibly driven downwardly to their FIG. 6B retracted positions, through the indicated distance X, the bottom sides 128 of the flexible skirts 126 are pressed downwardly against the bottom side portion 120 of the monoblock structure 38a in a manner causing the skirts to be vertically compressed, thereby permitting the top sides of the key cap members 40a to be held a level lower than at the bottoms of their keystrokes. The vertical height of the collapsible keyboard 12a in its retracted storage and transport orientation is thus further reduced by the skirt compression distance. When the key cap members 40a are subsequently returned upwardly to their FIG. 6A operative positions, the skirts 126 flex back to their original positions to give the key cap members 40a their normal, full-depth appearances.

The foregoing detailed description is to be clearly understood as being given by way of illustration and example only, the spirit and scope of the present invention being limited solely by the appended claims.

What is claimed is:

1. A collapsible keyboard structure for a portable computer, comprising:

a first support structure having top and bottom side portions;

a series of key cap members each carried on said top side portion of said first support structure for vertical movement relative thereto, through a vertical key stroke distance, between extended and retracted positions separated by a vertical distance greater than said key stroke vertical distance, each of said key cap members having a relatively rigid top side portion with a horizontal periphery, and a resiliently deflectable skirt portion anchored and extending around said periphery and extending downwardly and horizontally outwardly therefrom;

a second support structure carried beneath said first support structure and having a top side facing said bottom side of said first support structure; and a spaced series of resilient key return members anchored to said second support structure and having top end portions projecting upwardly beyond said top side of said second support structure, said first and second support structures being horizontally shiftable relative to one another between a first position in which said key return members underlie and resiliently hold said key cap members in said extended positions thereof and permit said key cap members to be resiliently moved downwardly from said extended positions through said key stroke distance, and a second position in which said key return members are horizontally shifted relative to said key cap members in a manner permitting said key cap members to be forcibly moved downwardly from said extended positions thereof to said retracted positions thereof without vertically compressing said resilient key return members, said resilient skirt portions of said key cap members bearing against and being deflected horizontally outwardly by said bottom side portion of said first support structure when said key cap members are in said retracted positions thereof.

2. The collapsible keyboard structure of claim 1 further comprising:

cooperatively engageable means on said key cap members and said second support structure for forcibly driving said key cap members from said extended positions thereof to said retracted positions thereof in response to shifting of said first and second support structures from said first position thereof to said second position thereof.

3. The collapsible keyboard structure of claim 2 wherein:

said keys are secured to said first support structure by scissored linkage arm assemblies, and said cooperatively engageable means include portions of said scissored linkage arm assemblies and a spaced series of projections formed on said top side of said second support structure and operative to drivingly engage and move said portions of said scissored linkage arm assemblies, in response to a relative shifting of said first and second support structures from said first position thereof to said second position thereof, in a manner forcibly collapsing said scissored linkage arm assemblies.

4. The collapsible keyboard structure of claim 1 wherein:

said keys are secured to said key support structure by scissored linkage arm assemblies each having a central portion with mutually angled bearing and cam surfaces thereon, said resilient key return members are hollow elastomeric dome members having upper ends and sloping side portions adjacent thereto, said upper ends of said dome members underlying and upwardly engaging said bearing surfaces when said first and second support structures are in said first position thereof, and said cam surfaces being positioned and configured to be slidingly engaged by said sloping dome member side portions in a manner driving said key members from said retracted positions thereof to said extended positions thereof in response to a relative shifting of said first and second support structures from said second position thereof to said first position thereof.

5. The collapsible keyboard structure of claim 1 wherein:

said first support structure is a generally rectangular monoblock support structure.

6. The collapsible keyboard structure of claim 1 wherein:

said second support structure comprises a multilayered signal pad structure with closable electrical contact structures underlying said resilient key return members.

7. The collapsible keyboard structure of claim 1 wherein:

said relatively rigid top side portions of said key cap members are of a plastic material, and said resilient skirt portions of said key cap members are of an elastomeric material.

8. The collapsible keyboard structure of claim 1 wherein:

said resilient skirt portions are molded onto said peripheries of said top side portions of said key cap members.

9. The collapsible keyboard structure of claim 8 wherein:

said peripheries of said top side portions of said key cap members have spaced series of through holes formed therein, and said resilient skirt portions have spaced series of projections thereon that extend through said through holes and anchor said skirt portions to their associated top side portion peripheries.

10. A portable computer comprising:

a base housing portion having a top side;

a lid housing portion secured to said base housing portion for pivotal movement relative thereto between a closed position in which said lid housing portion extends across and covers said top side, and an open position in which said lid housing portion uncovers and exposes said top side; and a collapsible keyboard structure including:
    a first support structure extending across said top side of said base housing portion and having top and bottom side portions,
    a series of key cap members each carried on said top side portion of said first support structure for vertical movement relative thereto, through a vertical key stroke distance, between extended and retracted positions separated by a vertical distance greater than said key stroke vertical distance,
        each of said key cap members having a relatively rigid top side portion with a horizontal periphery, and a resiliently deflectable skirt portion anchored to and extending around said periphery and extending downwardly and horizontally outwardly therefrom,
    a second support structure carried beneath said first support structure and having a top side facing said bottom side portion of said first support structure, and
    a spaced series of resilient key return members anchored to said second support structure and having top end portions projecting upwardly beyond said top side of said second support structure,
        said first and second support structures being horizontally shiftable relative to one another between a first position in which said key return members underlie and resiliently hold said key cap members in said extended positions thereof and permit said key cap members to be resiliently moved downwardly from said extended position through said key stroke distance, and a second position in which said key return members are horizontally shifted in a manner permitting said key cap members to be forcibly moved downwardly from said extended positions thereof to said retracted positions thereof without vertically compressing said resilient key return members,
        said resilient skirt portions of said key cap members bearing against and being deflected horizontally outwardly by said bottom side portion of said first support structure when said key cap members are in said retracted positions thereof.

11. The portable computer of claim 10 wherein:

said portable computer is a notebook computer.

12. The portable computer of claim 10 wherein:

said first support structure is anchored to said base housing portion, and said second support structure is horizontally shiftable relative to said first support structure.

13. The portable computer of claim 10 further comprising:

first shifting means, responsive to opening said lid housing portion, for shifting said one of said first and second support structures from said second position thereof to said first position thereof, and second shifting means, responsive to closing said lid housing portion, for shifting said one of said first and second support structures from said first position thereof to said second position thereof.

14. The portable computer of claim 13 wherein:

said first shifting means include spring means for resiliently biasing said one of said first and second support structures toward said first position thereof, and said second shifting means include cam means carried by said lid housing portion and operative, in response to closure of said lid housing portion, to engage said one of said first and second support structures and drive it from said first position thereof to said second position thereof.

15. The portable computer of claim 14 wherein:

said second support structure is a multilayered signal pad structure having closeable electrical contact structures underlying said resilient key return members.

16. The portable computer of claim 15 wherein:

said resilient key return members are elastomeric key return dome members.

17. The portable computer of claim 10 further comprising:

cooperatively engageable means on said key cap members and said second support structure for forcibly driving said key cap members from said extended positions thereof to said retracted positions thereof in response to shifting of said first and second support structures from said first position thereof to said second position thereof.

18. The portable computer of claim 17 wherein:

said key cap members are secured to said first support structure by scissored linkage arm assemblies, and said cooperatively engageable means include portions of said scissored linkage arm assemblies and a spaced series of projections formed on said top side of said second support structure and operative to drivingly engage and move said portions of said scissored linkage arm assemblies, in response to a relative shifting of said first and second support structures from said first position thereof to said second position thereof, in a manner forcibly collapsing said scissored linkage arm assemblies.

19. The portable computer of claim 10 wherein:

said key cap members are secured to said first support structure by scissored linkage arm assemblies each having a central portion with mutually angled bearing and cam surfaces thereon, said resilient key return members are hollow elastomeric dome members having upper ends and sloping side portions adjacent thereto, said upper ends of said dome members underlying and upwardly engaging said bearing surfaces when said first and second support structures are in said first position thereof, and said cam surfaces being positioned and configured to be slidingly engaged by said sloping dome member side portions in a manner driving said key members from said retracted positions thereof to said extended positions thereof in response to a relative shifting of said first and second support structures from said second position thereof to said first position thereof.

20. The portable computer of claim 10 wherein:

said first support structure is a generally rectangular monoblock support structure.

21. The portable computer of claim 10 wherein:

said relatively rigid top side portions of said key cap members are of a plastic material, and said resilient skirt portions of said key cap members are of an elastomeric material.

22. The portable computer of claim 10 wherein:

said resilient skirt portions are molded onto said peripheries of said top side portions of said key cap members.

23. The portable computer of claim 22 wherein:

said peripheries of said top side portions of said key cap members have spaced series of through holes formed therein, and said resilient skirt portions have spaced series of projections thereon that extend through said through holes and anchor said skirt portions to their associated top side portion peripheries.

* * * * *